United States Patent Office 2,835,679
Patented May 20, 1958

2,835,679

CRYSTALLIZABLE COMPLEX OF VITAMIN A ALDEHYDE AND SESAMOL AND ITS METHOD OF PREPARATION

Charles H. Benton, Jr., and Charles D. Robeson, Rochester, N. Y., assignors to Eastman Kodak Company, Rochester, N. Y., a corporation of New Jersey No Drawing. Application April 5, 1955
Serial No. 499,514

4 Claims. (Cl. 260—340.5)

This invention relates to a crystallizable complex of a trans,trans pentaene aldehyde having the carbon skeleton and chemical composition of vitamin A aldehyde, and to its method of preparation, and is particularly concerned with a crystallizable complex of 2,6-trans,trans vitamin A aldehyde which can be readily converted to the corresponding aldehyde.

Vitamin A aldehyde is itself an active form of vitamin A material and is also useful as an intermediate for conversion to vitamin A alcohol and vitamin A esters such as the acetate and the palmitate which are in common commercial use. Vitamin A aldehyde can exist in the form of several geometric isomers based on the cis and trans configuration around the olefinic bonds in the 2 and 6 positions as starred in the structural formula,

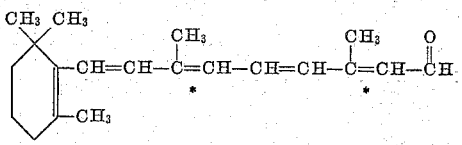

The geometrical isomers include 2,6-trans,trans vitamin A aldehyde; 2,6-cis,cis vitamin A aldehyde; 2-trans-6-cis vitamin A aldehyde; and 2-cis-6-trans vitamin A aldehyde. Of the geometrical isomers, however, the 2,6-trans,trans form exhibits the highest biological activity and it is therefore desirable to separate the 2,6-trans,trans aldehyde from the cis forms when, as is often the case, they occur in admixture. Because of the closely related properties of the cis and trans forms, however, it is difficult to effect such separations.

It is accordingly an object of this invention to selectively separate 2,6-trans,trans vitamin A aldehyde from an admixture containing one or more of the cis forms of vitamin A aldehyde by a novel method.

It is another object of this invention to provide a new crystallizable complex of 2,6-trans,trans vitamin A aldehyde from which 2,6-trans,trans vitamin A aldehyde can readily be regenerated.

It is a further object of this invention to facilitate the separation of a highly active form of vitamin A aldehyde from closely related isomers having lower biological activities by a new and improved method.

Another object of this invention is to provide a new crystallizable complex of 2,6-trans,trans vitamin A aldehyde unmixed with any substantial amount of cis forms of vitamin A aldehyde.

Another object of this invention is to provide a novel crystalline complex of 2,6-trans,trans vitamin A aldehyde having substantial stability to oxidation.

These and other objects are attained by means of this invention as described more fully hereinafter with particular reference to preferred embodiments thereof. We have discovered that sesamol selectively forms a crystallizable complex with 2,6-trans,trans vitamin A aldehyde but does not form crystallizable complexes with the isomeric cis forms of vitamin A aldehyde such as the cis,cis forms; the cis,trans forms; or, the trans,cis forms.

The 2,6-trans,trans vitamin A aldehyde isomer is commonly called retinene, or simply, all-trans vitamin A aldehyde. There are several methods for preparing vitamin A aldehyde, one method being disclosed in Robeson et al., United States Patent No. 2,507,647, wherein vitamin A alcohol was reacted with an excess of a ketone in the presence of an aluminum or magnesium alkoxide and an amine compound, such as aniline, to form an amine derivative which, upon acid hydrolysis gave vitamin A aldehyde. Another method for preparing vitamin A aldehyde is disclosed in Guntrum et al., United States Patent No. 2,676,991. Guntrum prepared vitamin A aldehyde by dehydrating, hydrolyzing and rearranging hydroxy polyene acetals having the carbon skeleton of vitamin A with an ionizable acid and an organic base. Likewise, vitamin A aldehyde prepared by any other process can be employed in the present invention.

Sesamol is a phenolic material which can be prepared from the hydrolysis of sesamolin, sesamolin being a naturally occurring material found in sesame oil. Likewise, sesamol can be prepared synthetically. Sesamol is reported to have the structural formula,

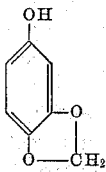

The exact nature of the present separable 2,6-trans,trans vitamin A aldehyde-sesamol complex is not known, but the aldehyde is readily regenerated in unchanged form by washing with aqueous alkali such as aqueous solutions of sodium or potassium hydroxide or the like. The product thus appears to be a complex rather than a chemically substituted derivative. The present complex is composed of one molar proportion of sesamol and two molar proportions of 2,6-trans,trans vitamin A aldehyde.

Vitamin A aldehyde is a very labile material and its biological activity is readily destroyed by oxidation. In contrast, the present crystallizable complex is extremely stable in the crystalline form. Samples of the present complex were exposed to air at a temperature of 55° C. for periods up to 1000 hours with no detectable loss due to oxidation. Accordingly, this complex can be stored or sold as a stable precursor of vitamin A aldehyde.

The complex is readily formed by adding sesamol to a solution containing 2,6-trans,trans vitamin A aldehyde in an inert organic solvent such as petroleum ether, hexane or a similar low boiling petroleum fraction, diethyl ether, methanol, ethanol, benzene or the like, or by adding the sesamol directly to a liquid mixture containing 2,6-trans,trans vitamin A aldehyde if the sesamol is soluble in the mixture under the conditions of addition. The complex is formed upon standing at room temperature, but slightly elevated temperatures, such as 40–70° C., are desirably used to aid in dissolving the sesamol.

The complex formed in accordance with this invention is then separated from the mixture by such methods as crystallization, distillation, adsorption and other well-known separating methods. The separation is readily accomplished because the chemical and physical properties of the complex differ greatly from any uncomplexed cis isomers that may be in the reaction mixture. The present complex can be easily separated by crystallization because of its relatively low solubility in inert organic solvents. The separation is thus readily accomplished by cooling and concentrating the reaction mixture to cause fractional crystallization of the complex. With solvents such as petroleum ether, diethyl ether or the like, crystallization occurs readily at room temperature, although lower temperatures can be used if desired. Alternatively, the entire reaction mixture can be dried and the uncomplexed cis isomers leached out of the resulting solid residue with an organic solvent, the cis forms of vitamin A aldehyde being soluble in most organic solvents.

The invention is illustrated by the following examples of certain preferred embodiments thereof, it being understood that the examples are not intended to limit the scope of the invention unless otherwise specifically indicated.

Example 1

A 0.2 g. sample of sesamol and a 0.4 g. sample of 2,6-trans,trans vitamin A aldehyde were dissolved in about 10 ml. of diethyl ether by warming gently on a steam bath. A 3 ml. portion of a low boiling petroleum ether (30–60° C. boiling range) was added and the resulting solution evaporated to a low volume under nitrogen on a water bath. The mixture was thereafter chilled to —20° C. and the resulting yellow crystals of the complex separated by filtration, washed on the filter with petroleum ether and dried. The dried complex was recrystallized twice from methanol to give a product with a melting range of 78.2–78.6° C. and had $$E_{1cm.}^{1\%}(381\,m\mu) = 1165 \text{ in ethanol}$$

A carbon and hydrogen analysis showed the presence of 79.4% carbon and 9.2% hydrogen in the recrystallized product.

Example 2

Likewise, sesamol selectively forms a crystallizable complex with 2,6-trans,trans vitamin A aldehyde from a mixture containing cis isomers of vitamin A aldehyde. A 3 g. portion of mixed trans and cis isomeric vitamin A aldehydes having $$E_{1cm.}^{1\%}(372\,m\mu) = 1110 \text{ in ethanol}$$

and a 0.7 g. portion of sesamol were dissolved in a low boiling petroleum ether (30–60° C. boiling range). The volume of the resulting reaction mixture was reduced by evaporation on a steam bath under nitrogen. The mixture was thereafter chilled to —20° C. and the resulting yellow crystals were removed by filtration, washed with petroleum ether and dried. The crystalline product was a complex comprised of two molar proportions of 2,6-trans,trans vitamin A aldehyde and one molar proportion of sesamol. The complex had a melting range of 77–79° C. and $$E_{1cm.}^{1\%}(380\,m\mu) = 1100 \text{ in ethanol}$$

A solution of the complex in diethyl ether was thereafter washed with 0.5 N. sodium hydroxide to remove the sesamol, leaving substantially pure 2,6-trans,trans vitamin A aldehyde in the ether layer. After crystallization from petroleum ether, the aldehyde product melted in the range of 62–64° C. and had $$E_{1cm.}^{1\%}(381\,m\mu) = 1520 \text{ in ethanol}$$

Since the cis forms of vitamin A do not form crystallizable complexes in accordance with this invention, the present 2,6-trans,trans complex can be readily separated from impure mixtures of the 2,6-trans,trans aldehyde with cis isomers thereof. Thereafter, pure 2,6-trans,trans vitamin A aldehyde is readily obtained by washing the sesamol out of the crystalline complex with aqueous alkali.

Further, the sesamol-containing complex prepared in accordance with the present invention exhibits substantial stability as compared to vitamin A aldehyde. Accordingly, the present complex provides a stable precursor from which 2,6-trans,trans vitamin A aldehyde can be readily regenerated.

Although the invention has been described in considerable detail with reference to certain preferred embodiments thereof, it will be understood that variations and modifications can be effected within the spirit and scope of the invention as described hereinabove and as defined in the appended claims.

We claim:

1. A crystallizable complex consisting of two molar proportions of 2,6-trans,trans vitamin A aldehyde and one molar proportion of sesamol.

2. The process which comprises dissolving sesamol and 2,6-trans,trans vitamin A aldehyde in an inert organic solvent at an elevated temperature, cooling the resulting solution to crystallize therefrom the resulting complex consisting of two molar proportions of 2,6-trans,trans vitamin A aldehyde and one molar proportion of sesamol, and thereafter separating said complex from said solution.

3. The process of separating 2,6-trans,trans vitamin A aldehyde from a vitamin A aldehyde composition containing 2,6-trans,trans vitamin A aldehyde and a cis isomeric form of vitamin A aldehyde which comprises dissolving said vitamin A aldehyde composition and sesamol in an inert organic solvent at an elevated temperature, selectively forming a crystallizable complex consisting of two molar proportions of 2,6-trans,trans vitamin A aldehyde and one molar proportion of sesamol, cooling the resulting solution to selectively crystallize therefrom said complex and thereafter separating said complex from said solvent.

4. The process which comprises dissolving 2,6-trans,trans vitamin A aldehyde and sesamol in petroleum ether at a temperature of 40–70° C., cooling the resulting solution to crystallize therefrom the resulting complex consisting of two molar proportions of 2,6-trans,trans vitamin A aldehyde and one molar proportion of sesamol, and thereafter separating said complex by filtration from said petroleum ether.

References Cited in the file of this patent

UNITED STATES PATENTS

| | | |
|---|---|---|
| 2,683,746 | Benton et al. | July 13, 1954 |
| 2,683,747 | Benton et al. | July 13, 1954 |